United States Patent
Sathish (10) Patent No.: US 9,495,773 B2
(45) Date of Patent: Nov. 15, 2016

(54) LOCATION MAP SUBMISSION FRAMEWORK

(71) Applicant: Nokia Corporation, Espoo (FI)

(72) Inventor: Sailesh K. Sathish, Tampere (FI)

(73) Assignee: Nokia Technologies Oy, Espoo (FI)

( * ) Notice: Subject to any disclaimer, the term of this patent is extended or adjusted under 35 U.S.C. 154(b) by 283 days.

(21) Appl. No.: 13/657,945

(22) Filed: Oct. 23, 2012

(65) Prior Publication Data

US 2013/0158859 A1 Jun. 20, 2013

Related U.S. Application Data

(60) Provisional application No. 61/550,607, filed on Oct. 24, 2011.

(51) Int. Cl.

| | |
|---|---|
| *G06T 11/20* | (2006.01) |
| *G01C 21/20* | (2006.01) |
| *G01C 21/32* | (2006.01) |
| *G06F 17/30* | (2006.01) |
| *G06T 11/60* | (2006.01) |
| *G09B 29/00* | (2006.01) |

(52) U.S. Cl.
CPC ............ *G06T 11/20* (2013.01); *G01C 21/206* (2013.01); *G01C 21/32* (2013.01); *G06F 17/30241* (2013.01); *G06T 11/60* (2013.01); *G09B 29/004* (2013.01)

(58) Field of Classification Search
CPC ...................... G01C 11/18; G01C 11/28; G01C 11/025; G01C 7/00
See application file for complete search history.

(56) References Cited

U.S. PATENT DOCUMENTS

| | | | | |
|---|---|---|---|---|
| 6,597,818 | B2 * | 7/2003 | Kumar et al. | 382/294 |
| 6,771,970 | B1 * | 8/2004 | Dan | 342/357.31 |
| 7,543,758 | B2 * | 6/2009 | Dymetman et al. | 235/494 |
| 8,649,565 | B1 * | 2/2014 | Kim | G06K 9/00369 382/106 |
| 2002/0034967 | A1 * | 3/2002 | Taniguchi et al. | 455/562 |
| 2003/0095708 | A1 * | 5/2003 | Pittel | 382/187 |
| 2004/0167669 | A1 * | 8/2004 | Karlsson | G01C 21/12 700/259 |
| 2005/0202831 | A1 * | 9/2005 | Sudit | G01C 21/20 455/456.1 |
| 2006/0111811 | A1 * | 5/2006 | Okamoto | B25J 5/007 700/214 |
| 2007/0035388 | A1 * | 2/2007 | Mock | G08B 25/08 340/505 |
| 2007/0035612 | A1 * | 2/2007 | Korneluk | G08B 13/19671 348/14.01 |
| 2009/0021576 | A1 * | 1/2009 | Linder | G03B 37/00 348/36 |

(Continued)

*Primary Examiner* — Adam Tissot
*Assistant Examiner* — Tommy Worden
(74) *Attorney, Agent, or Firm* — Harrington & Smith (57) ABSTRACT

In accordance with the exemplary embodiments of the invention there is at least a method and apparatus including computer programs executable by at least one processor to perform operations including scanning a location with a portable electronic device using a motion performed with the portable electronic device, based on the scanning using the motion, building a map of the location, and displaying the built map on the portable electronic device.

20 Claims, 4 Drawing Sheets

(56) References Cited

U.S. PATENT DOCUMENTS

| | | | |
|---|---|---|---|
| 2010/0007669 A1* | 1/2010 | Bethune et al. | 345/520 |
| 2010/0014712 A1* | 1/2010 | Sampedro Diaz | G08G 1/0104 382/104 |
| 2010/0029297 A1* | 2/2010 | Kim | H04W 12/08 455/456.1 |
| 2010/0106356 A1* | 4/2010 | Trepagnier et al. | 701/25 |
| 2010/0121577 A1* | 5/2010 | Zhang et al. | 701/301 |
| 2010/0199224 A1* | 8/2010 | Doerring | 715/856 |
| 2010/0229115 A1* | 9/2010 | Augustine | G06F 3/1454 715/800 |
| 2010/0274430 A1* | 10/2010 | Dolgov et al. | 701/25 |
| 2011/0112787 A1* | 5/2011 | Daw | G01V 3/15 702/95 |
| 2011/0172909 A1* | 7/2011 | Kahn | G01C 21/165 701/533 |
| 2011/0183732 A1* | 7/2011 | Block et al. | 463/1 |
| 2011/0188773 A1* | 8/2011 | Wei | G06K 9/40 382/260 |
| 2011/0242134 A1* | 10/2011 | Miller | A63F 13/10 345/633 |
| 2011/0251790 A1* | 10/2011 | Liotopoulos et al. | G08G 1/0969 701/533 |
| 2012/0265434 A1* | 10/2012 | Woodard | G08G 1/147 701/423 |
| 2013/0325317 A1* | 12/2013 | Pylappan et al. | 701/409 |
| 2014/0125700 A1* | 5/2014 | Ramachandran | G06T 7/0065 345/633 |

* cited by examiner

LOCATION MAP SUBMISSION FRAMEWORK

CROSS-REFERENCE TO RELATED APPLICATIONS

This patent application claims priority under 35 U.S.C. §119(e) from Provisional Patent Application No. 61/550,607 which was filed Oct. 24, 2011 the disclosure of which is incorporated by reference herein in its entirety.

TECHNICAL FIELD

The teachings in accordance with the exemplary embodiments of this invention relate generally to building a map of a location using a portable electronic device. More specifically, the teachings relate to building a map of a location using a portable device and allowing a user of the device to edit the built map, with the device, based upon the users perspective with regards to the location, and uploading the built map to a server at least for use by another user such as to provide to the user a layout and/or map of the location, such as an event location, and identify a position of one or more users at the location.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Service providers (e.g., wireless and cellular services) and device manufacturers are continually challenged to deliver value and convenience to consumers by providing compelling network services and advancing the underlying technologies. One area of interest has been the development of location based services and technologies for presenting mapping data to users of mobile devices (e.g., data that is presented as maps displayed on a user's wireless or cellular device). Accordingly, service providers and device manufacturers are continually challenged to develop new mechanisms for enhancing the mapping data and location based services provided to their users.

Certain abbreviations that may be found in the description and/or in the Figures are herewith defined as follows:
A-GPS assisted GPS
DP data processor
GPS global positioning system
eNB base station
MME mobility management entity
REST representational state transfer
UE user equipment
WLAN wireless local area network

SUMMARY

In an exemplary aspect of the invention, there is a method comprising scanning a location with a portable electronic device using a motion performed with the portable electronic device, based on the scanning using the motion, building a map of the location, and displaying the built map on the portable electronic device.

In another exemplary aspect of the invention, there is a portable electronic device comprising at least one processor, and at least one memory including computer program code, where the at least one memory and the computer program code are configured, with the at least one processor, to cause the device to at least: scan a location with the portable electronic device using a motion performed with the portable electronic device, based on the scanning using the motion, build a map of the location, and display the built map on the portable electronic device.

In still another exemplary aspect of the invention, there is an apparatus comprising means for scanning a location with a portable electronic device using a motion performed with the portable electronic device, means, based on the scanning using the motion, for building a map of the location, and means for displaying the built map on the portable electronic device.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The exemplary embodiments of the invention provide at least a method which allows a user of a portable electronic device, which may be referred to as a mobile device, to build a map of a particular location. More specifically, the embodiments of the invention provide at least a method to a build map of a location using data from a perspective of an individual at the location. This type of mapping, when shared, can allow others to identify on the map a location of the user that created the map with the portable electronic device.

Conventional location based applications of portable electronic devices do not provide sufficient resolution to identify where a user is located relative to features of a location, such as a stage of a concert hall or a point of interest of a location. Moreover although conventional location based service providers may be capable of interpreting and/or plotting high resolution maps, the conventional location technology applications that are available to the service providers cannot provide such high resolution maps to remote users, as required to clearly identify on the maps users and/or groups of users at a location. As such, the service providers who use these conventional location technology applications can only provide as high a resolution as the conventional applications are capable of. Therefore, as similarly stated above, the conventional applications, and thus the service providers, cannot create maps which can be used to identify where the users and/or groups of users are located from the perspective of a mapped location.

In order to address at least these shortfalls of the conventional applications, as stated above, the exemplary embodiments of the invention provide a method for a user of a portable electronic device to produce a resolution adjustable layout and/or map of a location using the device. The resolution adjustable layouts and/or maps enable a viewer of the map to identify a location, from any perspective of the mapped location, of the user that created the map. In addition, the exemplary embodiments of the invention provide the ability for the user to provide these novel maps to a server for availability by other users. A user provided map can then be used to formulate heuristics, such as for media combinations, based on a position of a user on a grid layout of a map built by the user with the portable electronic device. Such heuristics, or application logic, can be used by a service/application provider to request, for example, from user(s) at the location that the user(s) capture media from various different angles or positions based on particular grid location(s) of an uploaded map. Thus, the exemplary embodiments of the invention provide a clear benefit to application service providers for at least the reason the invention allows them to offer new and/or improved service which can be dynamic and interactive.

In addition, the method in accordance with the exemplary embodiments of the invention enables crowdsourcing map building tasks by an undefined group of people at a particular location. Crowd sourced map information services are known in the art. However, users of these conventional crowd sourced information services do not provide maps as such but rather they only enter points of interest data, significant places data or even correct incorrect data to existing maps. However, there are no services where users can themselves create and submit a map. In accordance with the exemplary embodiments, users are enabled to create approximations of a layout of areas using a motion function of a client application on device. As an example, three different users create a map of the same event location, for example, and each of the maps shows a location of the respective user at the event. After the three different maps have been uploaded to the server they can be combined into a single map which shows each of the three user locations at the event. In addition, in accordance with the embodiments of the invention the other two maps may be downloaded by one of the users and combined by the client application on the user device to depict a map showing the locations of all three users at the event. In addition, a first user, for example, may acquire more than one map from other users and combine the maps of the other users with the client application on the electronic device of the first user, without including a map built by the first user. Further, in accordance with an embodiment of the invention the maps may be acquired and/or shared between the users directly, such as with peer to peer communications using a network, the Internet and/or a cellular network for example, and/or using short range communication technologies such as Bluetooth and infra-red. In this regard, the client application can be configured to merge the maps using predefined permissions. Such permissions can include master client application permissions defined for a client application such that, for example, the master client application can use its own defined map layout of a location over other user layouts. In addition, in accordance with the embodiments the users are enabled to also make changes to their created layout, and if allowed, changes to the layouts created by the other users. Thus it can be seen that the operations in accordance with the invention can create a variety of new services as well as provide benefit to existing services.

As similarly stated above, the exemplary embodiments provide a method for creation and submission of individual maps and/or segments of maps built by each of one or more users at a particular location. Each individual segmented map built by an individual user at the location with a portable electronic device. Such individual segmented maps submitted by more than one user can be used for crowd-sourcing map building. The advantages of this crowdsourcing map building can be especially beneficial to users at a location such as an event location, a concert area, a sports arena, an event area, a karaoke-pub area, to name only a few. Furthermore, such novel map building techniques can be used to benefit a variety of applications, at least to enable a map to be displayed, on an electronic device, which identifies one or more users at the location. It is noted that the creation and submission process in accordance with the invention, as described in detail below, is applicable to both outdoors and indoor maps.

It is understood that presently an individual user may not be able to provide high-resolution maps through crowd sourcing technologies. However, the embodiments of the invention provide a client based solution where users can each at least provide a generalized segmented formation of a location or place, such as where an event may be taking place. Further, the exemplary embodiments of the invention can benefit any application which requires knowing user locations and/or tracking group movements without the need for individual accuracy.

The service (client software+server side software) depends on sensor combinations within the device to support map submissions and management. This includes orientation and location sensors.

In accordance with an exemplary embodiment of the invention, the server provides a RESTful (or other) interface for clients submissions. The RESTful interface allows interaction between clients and servers. The RESTful interface may be using HTTP and/or other Application Layer protocols. A client initiates a request to a server and then the server processes the request and responds accordingly. The request and the response involve a transfer of a representation of a resource. The resource can essentially be mapping data and a representation of a resource can be an object representation that captures a state of the resource.

Though user/client authentication (through accounts) and user rewards for submissions can be included in at least the method and apparatus in accordance with the invention, user/client authentication is known in the art and not further described in this description.

The exemplary embodiments of the invention may be practiced to the advantage of a user of a portable electronic device at least allowing the user to generate a segmented map of the location. A segmented map can be a generic map created with minimal information such as using a set of block tiles automatically or manually generated, with computer processes of the portable electronic device, for the user based on a wave action with the device.

Figure 1A:
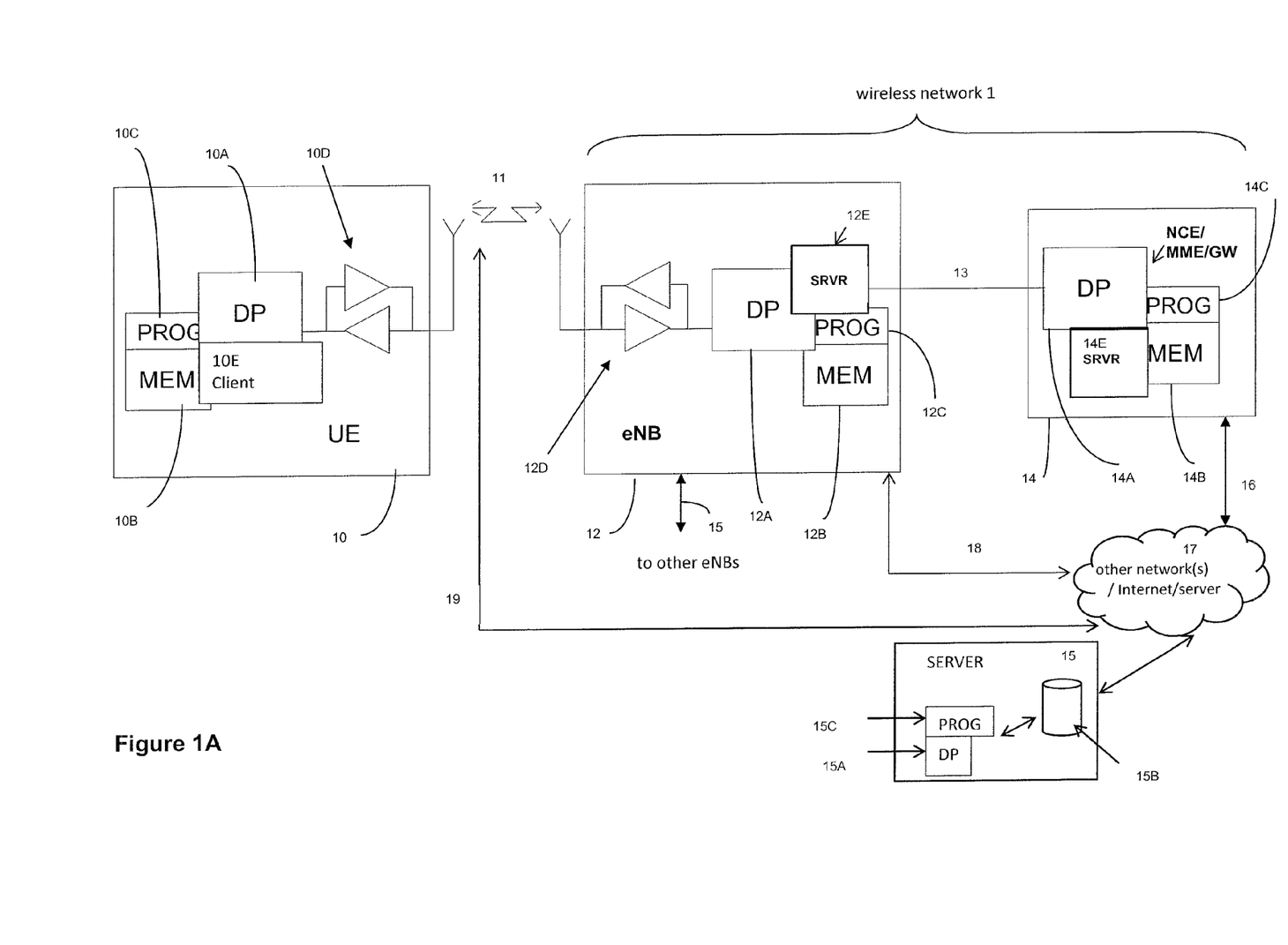
FIG. 1A illustrates an exemplary but non-limiting embodiment of a portable electronic device in which aspects of the invention may be practiced to advantage.

Reference is now made to FIG. 1A for illustrating a simplified block diagram of various electronic devices and apparatus that are suitable for use in practicing the exemplary embodiments of this invention. In FIG. 1A a wireless network 1 is adapted for communication over a wireless link 11 with a portable apparatus, such as UE 10, via a network access node, such as a base station, in this case the eNB 12. The network 1 may include a network control element (NCE) 14 that may include functionality as a mobility management entity MME and serving gateway GW, and which provides connectivity with a further network such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the GW 14.

At least the PROG 10C is assumed to include program instructions that, when executed by the associated DP, enable the device to operate in accordance with the exemplary embodiments of this invention, as discussed above by non-limiting examples. That is, the exemplary embodiments of this invention may be implemented at least in part by computer software executable by the DP 10A of the UE 10, or by hardware, or by a combination of software and hardware (and firmware). In addition, the server 15 similarly includes at least one computer readable memory and/or database 15B embodying at least one computer program code 15C, and at least one data processor 15A configured to execute computer program code to perform operations in accordance with the exemplary embodiments of the invention. In addition, the database 15B can be external to the server 15.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, Internet appliances permitting wireless Internet access and browsing, as well as portable units or terminals or tablets that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 1B:
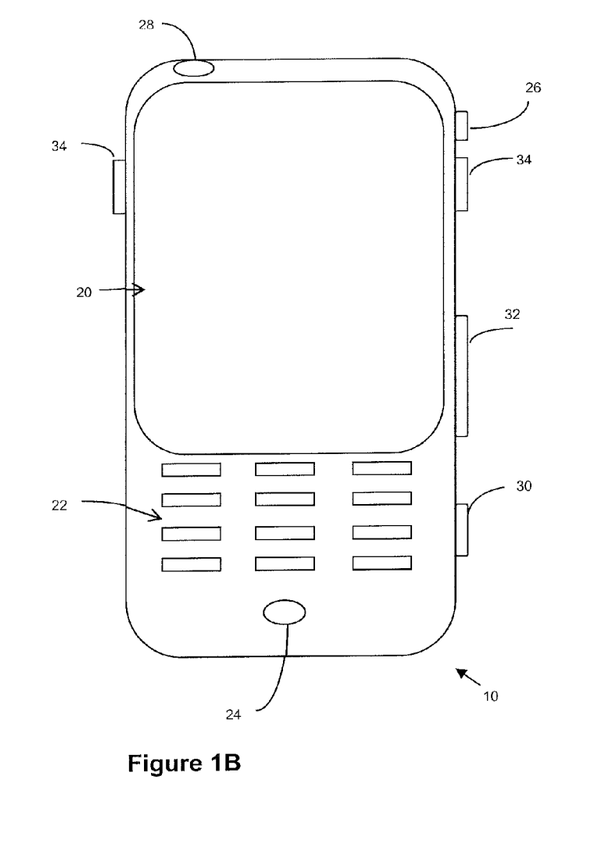
FIG. 1B illustrates a high level schematic diagram of a UE and certain network nodes in which exemplary embodiments of the invention may be practiced.

FIG. 1B illustrates further detail of an exemplary portable electronic device, a UE in both plan view (left) and sectional view (right), and the invention may be embodied in one or some combination of those more function-specific components. At FIG. 1B the UE 10 has a graphical display interface 20 and a user interface 22 illustrated as a keypad but understood as also capable of encompassing touch-screen technology as with the graphical display interface 20, and voice-recognition technology as received at the microphone 24. A power actuator 26 controls the device being turned on and off by the user.

The exemplary UE 10 may have a camera 28 controlled by a shutter actuator 30 and optionally by a zoom actuator 32 which may alternatively function as a volume adjustment for the speaker(s) 34 when the camera 28 is not in an active mode. There may also be an image/video processor 44 and/or a separate audio processor 46. The graphical display interface 20 is refreshed from a frame memory 48 as controlled by a user interface chip 50 which may process signals to and from the display interface 20 and/or additionally process user inputs from the keypad 22 and elsewhere.

Within the sectional view of FIG. 1B are seen multiple transmit/receive antennas 36 that are typically used for cellular communication. The antennas 36 may be multi-band for use with other radios in the UE. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and down converts the signal for baseband processing. The baseband (BB) chip 42 detects the signal which is then converted to a bit-stream and finally decoded. Similar processing occurs in reverse for signals generated in the UE 10 and transmitted from it.

Throughout the apparatus are various memories such as random access memory RAM 43, read only memory ROM 45, and in some embodiments there can be removable memory such as the illustrated memory card 47 on which the various programs 10C are stored.

Also within the UE 10 there are components including a GPS/A-GPS 37 (assisted GPS and/or GPS) 37, whose operations are detailed below in a non-limiting embodiment of the invention. In addition, the UE 10 can include an accelerometer or gyroscope (accel/gyro) 39 whose operations are also detailed below in a non-limiting embodiment of the invention. All of these components within the UE 10 are normally powered by a portable power supply such as a galvanic battery 49.

The processors 38, 40, 42, 44, 46, 50, if embodied as separate entities in a UE 10 or eNB 12, may operate in a slave relationship to the main processor 10A, 12A, which may then be in a master relationship to them. Other embodiments may combine some of the functions described above for FIG. 1B in fewer processors and/or memories. Any or all of these various processors of FIG. 1B access one or more of the various memories, which may be on-chip with the processor or separate therefrom.

Note that the various chips (e.g., 38, 40, 42, etc.) that were described above may be combined into a fewer number than described and, in a most compact case, may all be embodied physically within a single chip.

In accordance with the exemplary embodiments of the invention, there is a method for a user to invoke a client application 10E of a portable electronic device in order to create and to submit a segmented map of a particular indoor or outdoor location, such as an event location. The method is performed using a portable electronic device, the device including at least one computer program code stored on at least one computer readable memory, and the computer program code executed by at least one processor to perform the method. In accordance with the exemplary embodiments, the portable electronic device can be the UE 10, such as illustrated in FIGS. 1A and 1B, the method performed using suitable components such as the MEM 10B, the PROG 10C and the DP 10A of the UE 10.

Figure 2:
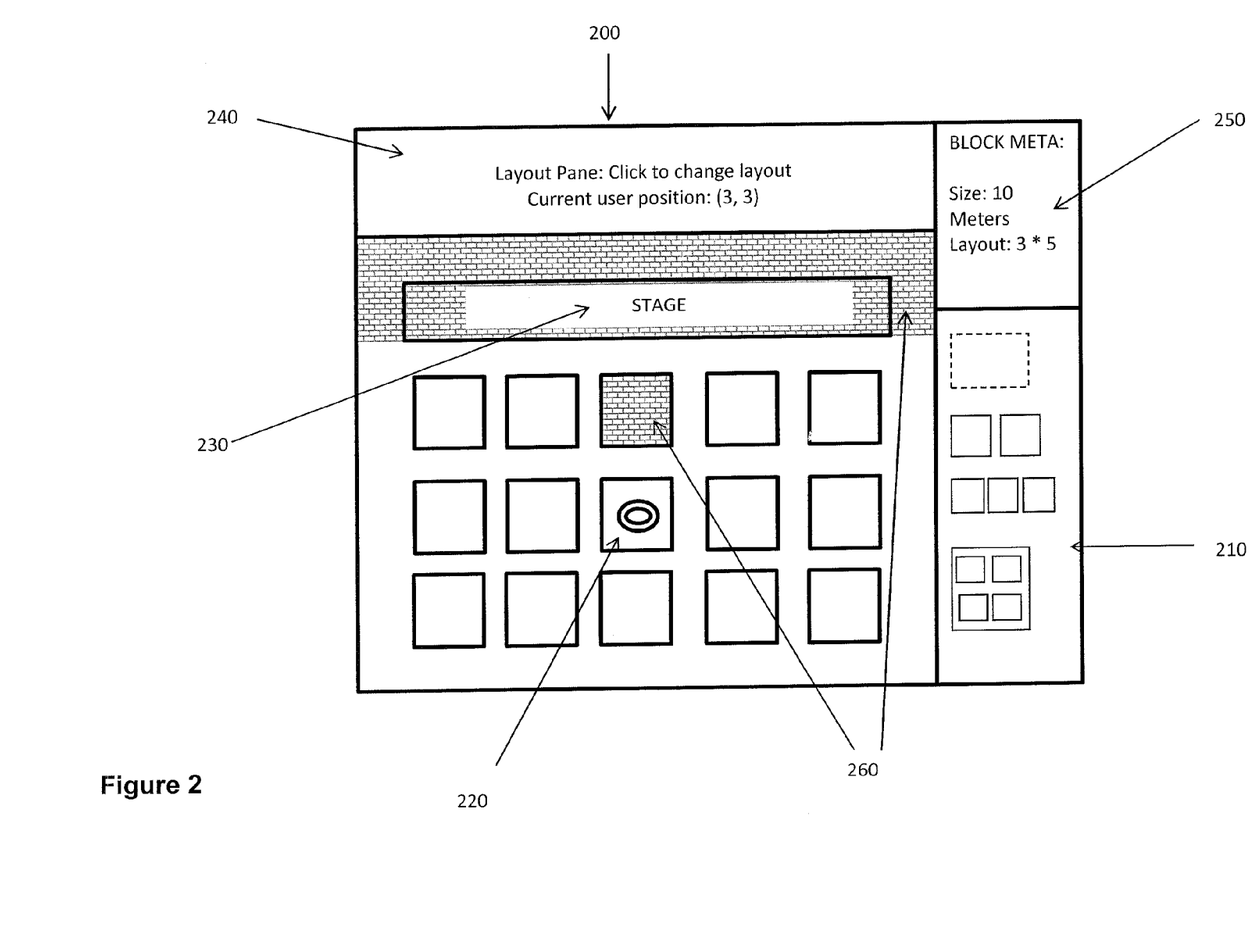
FIG. 2 illustrates one representation of a client application user interface, such as on a display of a portable electronic device, in accordance with the exemplary embodiments of the invention.

The exemplary embodiments of the invention will now be described in more detail below at least in part with regards to FIG. 1A, FIG. 1B, as described above, and in view of FIG. 2. FIG. 2 illustrates a user interface (UI) 200 of a client application running on the portable electronic device 10, in accordance with the exemplary embodiments of the invention. It is noted that, as stated above, a portable electronic device suitable to perform the method in accordance with the exemplary embodiments of the invention is not limited to user equipment of a cellular network, such as the UE 10. Rather, as similarly stated above, the embodiments of the invention can be practiced using any type of portable electronic device with wireless communication capabilities.

As a non-limiting example, it is assumed that the user is located at an indoor location, such as where an event can take place. As stated earlier, the exemplary embodiments of the invention enable the user of a portable electronic device to generate a segmented map of a location. A method in accordance with the exemplary embodiments of the invention is described in stages as follows:

Stage 1: Checking for Existing Map

A client application 10E on the UE 10 retrieves location coordinates, such as with a GPS/A-GPS 37 function of the UE 10. In addition, the coordinates may be retrieved from other location functions of the device and/or functions of the network in which the device is operating, such as WLAN location identification service of the network. The client application 10E sends a type of map check request to a server, such as the server 15. A map check request may query the server such as regarding whether there is already a map available for this location. Also the request may automatically include, if a map exists, a query regarding the resolution of the map. Further, the map check request can query whether the map is configurable or editable by a user, such as to define a higher resolution for the map and/or replace the map and/or and define/redefine parameters associated with the map. It is noted that such parameters can include, but are not limited to, grid numbers and tile sizes of the map.

With regards to FIG. 1A, in accordance with the exemplary embodiments of the invention, the server can be incorporated in a network node of the wireless communication network 1 to which the UE 10 may be associated, such as the server 12E and 14E, or the server can be external to the wireless communication network, such as the server 15, as illustrated in FIG. 1A. In the latter case, the client application 10E may communicate with the server 15 via the wireless communication network 1, such as over paths 18 or 16, or the client application 10E may communicate with the server 15 directly via the other network 17, such as via the Internet. Further, in accordance with the exemplary embodiments, the UE 10 may communicate with the server 15 via the other network 17 using a connection 19 which may include a wired and/or wireless connection to the other network 17.

The server 15 checks existing map data against the location data within a database or memory associated with the server 15. If a map exists the map is retrieved from the server and the user location is identified within a defined boundary of the map by the client application 10E displayed on the graphical display interface 20. In this example, the client application 10E receives a response message from the server which indicates that the map exists. Further, the client application 10E receives, in the same message or in a separate message, a response from the server which includes information regarding the existing map. The existing map message and the map information is received with the UE 10 Further, in accordance with the exemplary embodiments of the invention, the UI of the client application 10E visually displays to the user of the client application 10E an indication of the existing map message. Further, in accordance with an exemplary embodiment of the invention, the map information includes information regarding whether or not the map can be modified by the user. Such an indication can include an indication of whether the server has accepted the resolution for the map. If the server has accepted the resolution for the map then the resolution of the map is not modifiable by the user. However, if the map information from the server indicates that the map is able to be modified, then the user can use the client application 10E to modify the map, at least as stated above. Further, in accordance with the embodiments, the user can, if desired, upload the modified map to the server with the client application 10E. In addition, in accordance with the exemplary embodiments of the invention, the client application 10E can render the map using only mapping data from the server. Further, if it is determined that the map can be configured by the client application 10E with a better resolution then the client application 10E can indicate this to the server as well as the user. The client application 10E may then receive a response from the server of whether or not such a modification would be accepted by the server. The client application 10E will also indicate this response from the server to the user via the UI of the client application 10E.

Stage 2: Building the Map

With the client application 10E open, the user performs a scan of the location where the user is currently positioned. The scan can be performed by the user with the UE 10, by waving the UE 10 in the air, using one or more different motions, while directing or pointing the UE 10 towards the location to be scanned. The wave motion, which may be referred to as a gestural action, can be a semicircular motion, a full 360 circle, a straight motion from one end to another and/or other motions. During the one or more wave motions the client application 10E records accelerometer and/or gyroscope data, such as is performed using the data from the accel/gyro function 39 of the UE 10. Using a sensor inference algorithm the client application 10E determines the motion that the user has performed.

Referring to FIG. 2, which illustrates the user interface of the client application 10E, the user is then presented a set of tiles 210 displayed by the client application 10E on the graphical display interface 20. Each tile of the tiles 210 has a different resolution. The user then selects a tile of the tiles 210, such as by touching (thereby selecting on a touch screen) or using a pointer of some sort or mouse-clicking on one tile of the set of tiles 210 or by selecting a hard or soft key of the device that is associated with the tile. The selected tile is used by the client application 10E to build the map at a resolution of the tile selected by the user. In a non-limiting exemplary embodiment of the invention, the selected resolution is displayed somewhere on UI 200 of the client application 10E. As an example, the selected resolution can be displayed in any of the blocks 210, 220, 240, and 250 or any other location on the UI 200 of the client application 10E. In addition, it is note that the blocks illustrated in FIG. 2 are not limiting. For example, one or more of the blocks 210, 220, 240 and 250 may be located in different locations of the UI 200 of the client application 10E. In accordance with the exemplary embodiments of the invention, an indicator 260 may be used to identify a block/area such as the block immediate front center of the stage 230 and/or the area at the back of the stage 230 that is not allowed to be entered by a user. Further, it is noted that, in accordance with the exemplary embodiments of the invention, the block 210 of the UI 200 and/or the tiles shown in the block 210 are dynamically created by the client application 10E based on at least a particular type of wave motion gesture performed by the user of the UE 10, as described in more detail below.

In addition, in accordance with the exemplary embodiments of the invention, the user desired resolution can be predetermined such as by settings on the client application 10E or default settings by the user of the client application 10E.

Now, based on the one or more wave motions (gestural actions) that the user has performed and the selected resolution, the client application 10E builds a map for the user. The map includes an indication of the user at the location. As an example, a circular motion will show a circle built with the tiles with the user at the center. The user position can be indicated via a small indicator on the user interface of the client application 10E which is displayed on the graphical display interface 20. Further in accordance with the exemplary embodiments, as illustrated in FIG. 2, for a horizontal motion, a grid layout for the map is built with the tiles such that a stage 230 is shown with an indicator 220 depicting the user's position at the center of the grid layout and facing the stage 230. This "facing" by the user may also be shown on the map with an arrow, as produced by the user with the client application user interface (UI). In addition, in accordance with the exemplary embodiments of the invention, each type of wave motion gesture can be identified with its own particular type of layout.

In addition, the user can change the layout if desired by choosing from different layouts shown by the client application UI, as shown in block 210. The different layouts can be ordered according to a probability based on the wave motion. The user can also use the client application UI to change their relative position shown on the grid as well as a direction of the user. Further, the user can use the client application UI to zoom in to the grid layout, and also to change their position on a tile without jumping to another tile.

In accordance with another exemplary embodiment of the invention, the user of the UE 10 can configure, using the client application, different indicators for different blocks and/or tiles of the built map. Such indicators can convey information such as whether or not a user is allowed to enter a particular area defined by a blocks and/or tile. Further, such areas can be identified by the client application 10E using such indicators. For example, an indicator can identify an area as astage area, a comfort room, or a parking area, etc. In accordance with the exemplary embodiments of the invention, as similarly stated above with regards to FIG. 2, the client application UI 200 can be used to provide such an indicator 260 to convey that the block in the immediate front center of the stage 230 and the back of the stage 230 are not allowed to be entered by a user. It is noted that the indicators can be customized by a user with the client application 10E so as to be any shape and/or color desired by the user. Additionally, areas and/or blocks and/or features of the map can be configured with sounds, such as personalized sounds and/or event sounds, and/or names of people places, to name only a few. These sounds can be initiated by moving a mouse pointer over a location on the map and/or the sounds can be played based on a location of the user with respect to a location depicted by the map, such as to direct the user of the map to a particular person, place or feature of the location. This can be accomplished by the client application 10E using data from GPS/A-GPS function 37 or other location based functions of the user's device. Further, the user may personalize this indicator, as well as any one or more blocks of the maps. For example, the user may decide to incorporate still frame or animated pictures/videos as an indicator and/or as a background of any feature, block, and/or space on the map. In addition, business logos or advertisements may be incorporated into the map. These logos and/or advertisements can be customized based on a location of a user who downloads a map, in accordance with the exemplary embodiments. This also can be accomplished by the client application 10E using data from GPS/A-GPS function 37 or other location based functions of the UE 10. Further, any of these features/customizations can be incorporated into the map when the map is being built by the client application 10E and/or into a map that is retrieved by the user with the client application 10E and/or by an authorized third party with some type of access to the server 15, such as by agreement with a service provider and/or operator. The server and/or the service provider and/or operator can reserve the right to remove, add, and/or replace any such map customizations. Further, the exemplary embodiments of the invention can be beneficial to operators and/or service providers as they can sell such services to, for example, users and businesses to enable such customizations of the maps.

In addition, with the client application 10E the user can select one or more blocks, and then place those blocks on the map, for example by dragging and dropping over a touch screen of the UE 10. This feature is beneficial for at least the reason that the user is enabled to build a more complete map which identifies location information not found in maps of conventional location based applications. Further, these defined blocks and/or tiles are incorporated in the built map uploaded to the server such as for use by the server to identify, to other users, areas of the location where a user presence is not allowed. Further, based on these types of indications by the client application 10E the server can provide notifications and/or error indications such as for corrections needed in location layouts of uploaded maps to other users.

Stage 3: Indicating Size of the Map

Each tile shown to the user has a default set of properties. Once a map is made, a grid-base of the map is constructed. The grid base acts as the base on which tiles are pasted. The grid base uses a coordinate system with the top left corner having the value 0,0, or two dimensions. It is noted that the exemplary embodiments of the invention enable the grid base and the coordinate system of the client application to reflect 3 dimensions as well. All slots on the grid are then numbered relative to an origin slot. The number of tiles used corresponds exactly to the number of slots on the grid layout. The grid layout can be represented as a vector set of coordinates and the client can reconstruct the map given the coordinate set.

Each tile used in the grid layout has a set of properties. The properties of a tile are caused to be displayed by the client application 10E by selecting the tile and performing a right mouse click on the tile or by pressing on the tile, such as with a touchscreen user interface, for a predetermined period of time. It is noted that the period of time for this pressing to result in a display of the tile properties is a configurable threshold value of seconds which may be defined by a manufacturer and/or by a user with the client application 10E. The displayed property information presents to the user meta-information about the tile, such as the meta-information 250 of FIG. 2. The meta-information provides an estimated size of the tile in any measurable quantity selected by the user, such as meters. Further, the layout pane 240 of the client application 10E can be selected to enter an edit mode where the user can choose either a preset size for the tile or manually enter change information regarding a size of a tile as indicated in the meta-information 250 for example. Also after a map grid layout is shown on the client user interface 200, the user can add or remove rows and columns from the layout. It is noted that any or the above described embodiments can be performed by user selection via the graphical display interface 20, which can be a touch screen, and/or an associated keypad. In addition, the client application 200 enables the user to drag and drop objects such as tiles, columns and/or rows to or from locations of the map and or grid layout. In addition, the client user interface 200 provides edit options such as to add rows and add columns so that the user can add or provide number of rows to insert and number of tiles used in each row and/or column, or similarly remove tiles used in a row and/or column. Further, these edit mode operations will cause the client application 10E to automatically update or change the coordinate data of block 240 and the meta-information 250 according to any changes. It is noted that the coordinate data is not editable by the user and is always assigned by the client application 10E. The user can also replace any tile with tiles of other shapes.

In another embodiment, the client application 10E, with the features of the device as described above, can also apply a distance through depth estimation algorithm to a map layout acquired using the wave motion or gestural action with the UE 10. Through depth estimation, an estimate is made that provides size information of the tiles that are used as well as more accurate indications of the user's position in the formulated map. In accordance with the exemplary embodiments of the invention, a size of the map can be estimated based on, for example, a particular panning distance of the gestural motion (or wave motion) performed by the user when scanning the location with the UE 10 and/or a speed of the panning motion. For depth estimation of a location or a feature of a location, the client application 10E may use algorithms known in the art and, based on the UE 10 or camera position and image(s) captured, determine the depth. In addition, it is noted that the exemplary embodiments of the invention are not limited to two dimensional map acquisition and building. The client application 10E can be used to perform all the novel operations, as in accordance with the exemplary embodiments described herein, with three dimensional maps and/or devices (e.g., 3-D cameras) as well.

With the grid layout finalized and with the tile numbers and size of tiles defined, the client application 10E infers the size of the map and location of the place using the user location indicated via the layout (user location is known through the user's current coordinates). The client application 10E uploads the grid coordinate vectors, the user position and the meta-information about the tiles to the server 15 where it can be stored.

In accordance with another exemplary embodiment of the invention, the client application 10E can be used to provide additional information to the server. As one non-limiting example, the client application can provide dynamic information about an event that is going to happen at that place.

Based on at least the above, it can be seen that the exemplary embodiments of the invention provide a benefit for a user of a portable electronic device for building maps for at least the following reasons:

This is true ease of use in building approximations of indoor/outdoor maps;
The client application 10E allows for variable size declarations;
The client application 10E is intuitive for the user;
The maps are able to be modified by the client application 10E;
The client application 10E is ideal for providing location and user info as meta data to a recorded media;
Multiple location technologies can be mapped to a grid map area;
The client application 10E supports both indoor and outdoor locations; and
The client application 10E is applicable for any type of portable electronic device including both mobile devices and tablets.

Figure 3:
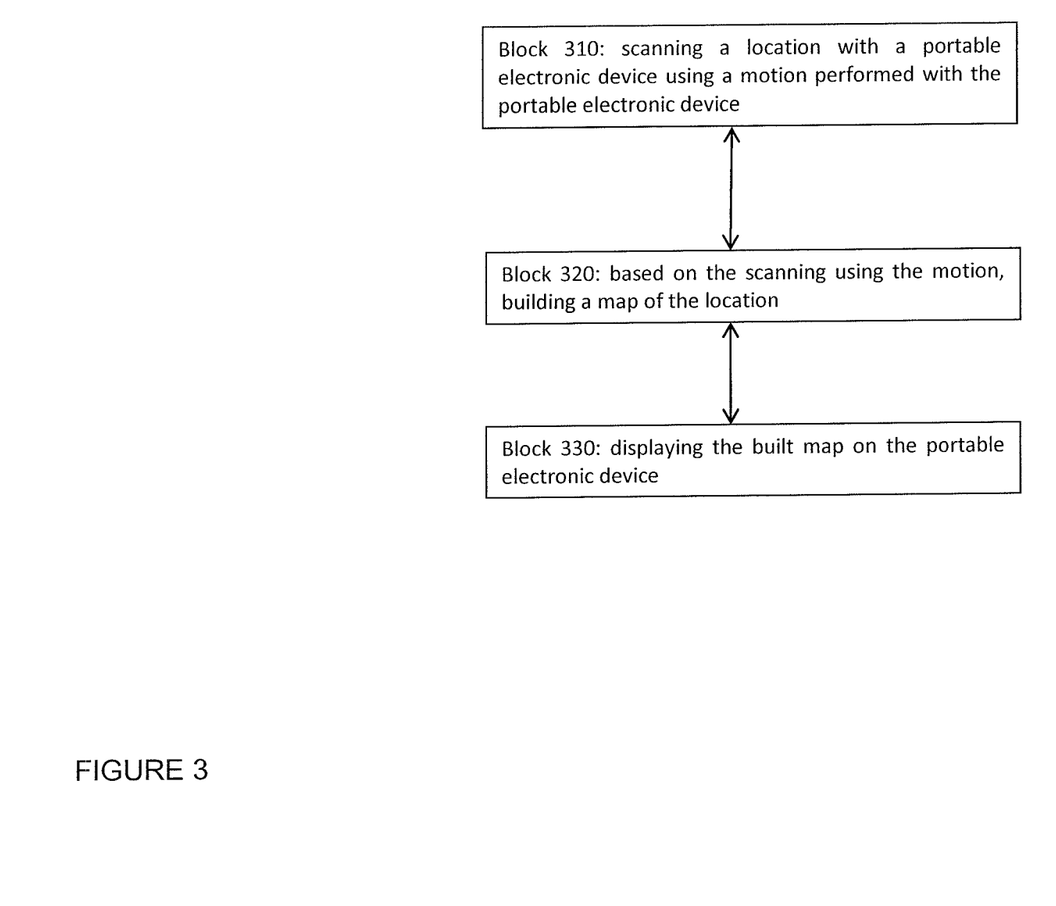
FIG. 3 is a simplified block diagram which illustrates a method in accordance with the exemplary embodiments of the invention.

FIG. 3 is a block diagram illustrating a method in accordance with the exemplary embodiments of the invention. In block 310 there is a step scanning a location with a portable electronic device using a motion performed with the portable electronic device. In block 320 there is a step, based on the scanning using the motion, of building a map of the location. In block 330 there is a step of displaying the built map on the portable electronic device.

The exemplary embodiments of the invention, as described in the paragraph above, including sending the map to a server via a wireless communication network.

The exemplary embodiments of the invention, as described in the paragraphs above, where the motion performed with the portable electronic device comprises one of a circular motion, a semi-circular motion and a straight motion The exemplary embodiments of the invention, as described in the paragraphs above, where building the map comprises at least one of using acceleration and gyroscope data detected by the portable electronic device during the scanning to determine the motion performed with the portable electronic device.

The exemplary embodiments of the invention, as described in the paragraph above, where the determined nature of the motion is used to determine a grid layout of the map.

The exemplary embodiments of the invention, as described in the paragraph above, where coordinates regarding the current position of the user are identified on the display of the electronic device.

The exemplary embodiments of the invention, as described in the paragraphs above, including defining, with a user interface of the portable electronic device, features representative of the location and inserting the features into the map with the user interface.

The exemplary embodiments of the invention as described in the paragraph above, wherein one or more of the blocks, columns and rows inserted into the map comprise an indicator of whether areas associated with the one or more of the blocks, columns, and rows is accessible by a user at the locations.

The exemplary embodiments of the invention, as described in the paragraph above, where the defined features inserted into the map comprise at least one of columns and rows representative of the features of the location.

The exemplary embodiments of the invention, as described in the paragraphs above, including selecting using the portable electronic device, a resolution of the map.

The exemplary embodiments of the invention, as described in the paragraph above, where selecting the resolution of the map comprises selecting a tile displayed on a display of the portable electronic device, where the map is built at the resolution of the selected tile.

The various blocks shown in FIG. 3 may be viewed as method steps, and/or as operations that result from operation of computer program code, and/or as a plurality of coupled logic circuit elements constructed to carry out the associated function(s). It should be appreciated that although the blocks shown in FIG. 3 are in a specific order of steps that these steps may be carried out in any order or even some of the steps may be omitted as required.

In addition, in accordance with the exemplary embodiments of the invention there is a portable electronic device including at least one processor, and at least one memory including computer program code, where the at least one memory and the computer program code are configured, with the at least one processor, to cause the apparatus to at least scan a location with a portable electronic device using a motion performed with the portable electronic device, and, based on the scanning, using the motion, build a map of the location. Then display the built map on the portable electronic device.

The exemplary embodiments of the invention, as described in the paragraph above, where the at least one memory including the computer code is configured, with the at least one processor, to cause the portable electronic device to send the map to a server via a wireless communication network.

The portable electronic device, as described in the paragraphs above, where the motion performed with the portable electronic device comprises one of a circular motion, a semi-circular motion and a straight motion.

The portable electronic device, as described in the paragraphs above, where building the map comprises the at least one memory including the computer code is configured, with the at least one processor, to cause the portable electronic device to use at least one of acceleration and gyroscope data detected by the portable electronic device during the scanning to determine the motion performed with the portable electronic device.

The portable electronic device, as described in the paragraph above, where the determined nature of the motion is used to determine a grid layout of the map.

The portable electronic device, as described in the paragraph above, where coordinates regarding the current position of the user are identified on the display of the electronic device.

The portable electronic device, as described in the paragraphs above, including defining, with a user interface of the portable electronic device, features representative of the location and inserting the features into the map with the user interface.

The portable electronic device, as described in the paragraph above, where the defined features inserted into the map comprise at least one of columns and rows representative of the features of the location.

The portable electronic device, as described in the paragraphs above, including selecting using the portable electronic device, a resolution of the map.

The portable electronic device, as described in the paragraph above, where selecting the resolution of the map comprises selecting a tile displayed on a display of the portable electronic device, where the map is built at the resolution of the selected tile.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. A method comprising:
    identifying, by a portable electronic handheld device, coordinates of a current location of the portable electronic handheld device;
    based on the coordinates, querying, by the portable electronic handheld device, a server for an availability at the server of a map of the current location of the portable electronic handheld device;
    receiving, for a case that it is determined that no map of the current location is available at the server, via a client application of the portable electronic handheld device, instructions to perform scanning during a motion, by the portable electronic handheld device, the current location of the portable electronic handheld device, where the scanning is using an image capture device of the portable electronic handheld device during the motion determined by at least one of accelerometer and gyroscope of the portable electronic handheld device, wherein the determined motion of the portable electronic handheld device comprises at least one of a circular motion, a semi-circular motion and a straight motion of the portable electronic handheld device at the location;
    based on the scanning using the image capture device and the motion, building, by the client application of the portable electronic handheld device, a map of the location, wherein the map is segmented as a grid layout, wherein at least a shape of the grid layout of the map is changed with a user interface of the client application by placing tiles of different tile types into the grid layout;

displaying, by the portable electronic handheld device, the built map on a display of the portable electronic handheld device; and uploading information of the segmented map to the server, wherein the information comprises the segmented map and grid coordinate vectors which identify the location of the portable electronic handheld device on the segmented map, and wherein the uploaded information is made available to other portable electronic handheld devices via the server.

2. The method according to claim 1, wherein for a case it is determined that there is the availability of the map of the current location at the server, the method comprising:

retrieving with the client application from the server information comprising the existing map, wherein the current location of the portable electronic handheld device is identified on the existing map, and wherein the information from the server comprises an indication of whether the existing map can be modified with the user interface of the client application of the portable electronic handheld device;

based on an indication that the existing map can be modified by the with the user interface, modifying the existing map with the user interface of the client application and uploading the modified existing map to the server using the client application, wherein the modifying comprises a modification of at least one of a resolution of the existing map and the current location of the portable electronic handheld device on the existing map; and uploading the modified map to the server to be made available to other portable electronic handheld devices via the server.

3. The method according to claim 1, comprising, tracking, by the portable electronic handheld device, with the at least one of accelerometer and gyroscope a movement of the portable electronic handheld device to the location prior to the scanning.

4. The method according to claim 1, wherein building the map comprises using, by the portable electronic handheld device, acceleration and gyroscope data detected by the least one of the accelerometer and the gyroscope of the portable electronic handheld device during the scanning to determine the motion of the portable electronic handheld device.

5. The method according to claim 4, wherein the determined motion is used by the client application of the portable electronic handheld device to determine the grid layout of the map.

6. The method according to claim 2, wherein the coordinates of the current location of the portable electronic handheld device and the information from the server comprising the existing map are presented by the client application of the portable electronic handheld device on the display of the portable electronic handheld device.

7. The method according to claim 1, further comprising, defining by the portable electronic handheld device, with the user interface of the client application of the portable electronic handheld device features representative of the location and inserting, with the client application of the portable electronic handheld device, an indicator of the features into a grid of the grid layout of the map with the user interface.

8. The method according to claim 7, wherein the defined features inserted into the map comprise at least one of blocks, columns and rows representative of the features of the location.

9. The method according to claim 8, wherein one or more of the blocks, columns and rows inserted into the map comprise an indicator of whether each area associated with the one or more of the blocks, columns and rows is accessible by a user at the location.

10. The method according to claim 1, further comprising:

selecting, using the user interface of the client application of the portable electronic handheld device, a tile placed in the grid layout on the map; and in response to the selecting, displaying on the display of the portable electronic handheld device information comprising a size of an area of the location that is identified by the tile in the grid layout on the map.

11. The method according to claim 1, wherein the tiles have different shapes, wherein indicators regarding features at areas of the map are inserted with the user interface of the client application into one or more of the tiles placed in the grid layout at the areas, the indicators regarding the features of the map identify at least one of a use and a name of an area of the location associated with the tile, and wherein indicators regarding the features of the map are customizable with the user interface to be shown on the map using any shape or color.

12. A non-transitory computer readable medium embodying a computer program, the computer program executable by at least one processor to cause the portable electronic handheld device to perform the method according to claim 1.

13. A portable electronic handheld device comprising:

at least one processor; and at least one memory including computer program code, where the at least one memory and the computer program code are configured, with the at least one processor, to cause the device to at least:

identify coordinates of a current location of the portable electronic handheld device;

based on the coordinates, query a server for an availability at the server of a map of the current location of the portable electronic handheld device;

receive, for a case that it is determined that no map of the current location is available at the server, via a client application of the portable electronic handheld device, instructions to perform a scan during a motion of the portable electronic handheld device of the current location of the portable electronic handheld device, where the scanning is using an image capture device of the portable electronic handheld device during the motion determined by at least one of accelerometer and gyroscope of the portable electronic handheld device itself, wherein the determined motion of the portable electronic handheld device comprises at least one of a circular motion, a semi-circular motion and a straight motion of the portable electronic handheld device at the location;

based on the scanning using the image capture device and the motion, build by the client application of the portable electronic handheld device a map of the location, wherein the map is segmented as a grid layout, and wherein at least a shape of the grid layout of the map is changed with a user interface of the client application by placing tiles of different tile types into the grid layout;

display the built map on a display of the portable electronic handheld device; and upload information of the segmented map to the server, wherein the information comprises the segmented map and grid coordinate vectors which identify the location of the portable electronic handheld device on the segmented map, and wherein the uploaded information is made available to other portable electronic handheld devices via the server.

14. The portable electronic handheld device according to claim 13, wherein for a case it is determined that there is the availability of the map of the current location at the server, the at least one memory including the computer program code is configured with the at least one processor to cause the portable electronic handheld device to:

retrieve with the client application from the server information comprising the existing map, wherein the current location of the portable electronic handheld device is identified on the existing map, and wherein the information from the server comprises an indication of whether the existing map can be modified with the user interface of the client application of the portable electronic handheld device;

based on an indication that the existing map can be modified with the user interface of the client application, modify the existing map with user interface of the client application and uploading the modified existing map to the server using the client application, wherein the modifying comprises a modification of at least one of a resolution of the existing map and the current location of the portable electronic handheld device on the existing map; and upload the modified map to the server to be made available to other portable electronic handheld devices via the server.

15. The portable electronic handheld device according to claim 13, wherein the motion of the portable electronic handheld device is performed by a user of the portable electronic handheld device.

16. The portable electronic handheld device according to claim 13, wherein building the map comprises using acceleration and gyroscope data detected by the at least one of accelerometer and gyroscope of the portable electronic handheld device during the scanning to determine the motion.

17. The portable electronic handheld device according to claim 16, wherein the determined motion is used by the client application to determine a grid layout of the map.

18. The portable electronic handheld device according to claim 14, wherein the coordinates of the current location of the portable electronic handheld device and the information from the server comprising the existing map are presented by the client application of the portable electronic handheld device on the display of the portable electronic handheld device.

19. The portable electronic handheld device according to claim 13, wherein the at least one memory including the computer program code is configured, with the at least one processor, to cause the portable electronic handheld device to define, with the user interface of the client application of the portable electronic handheld device, features representative of the location; and insert with the client application an indicator of the features into a tile in a grid location of the map with the user interface of the portable electronic handheld device.

20. The portable electronic handheld device according to claim 19, where the defined features inserted into the map comprise at least one of blocks, columns and rows representative of the features of the location.

* * * * *

UNITED STATES PATENT AND TRADEMARK OFFICE
CERTIFICATE OF CORRECTION

PATENT NO. : 9,495,773 B2
APPLICATION NO. : 13/657945
DATED : November 15, 2016
INVENTOR(S) : Sathish

It is certified that error appears in the above-identified patent and that said Letters Patent is hereby corrected as shown below:

In the Claims

Claim 2, Column 15, Line 29 "by the" should be deleted.

Claim 13, Column 16, Line 57 "itself" should be deleted.

Signed and Sealed this
Thirty-first Day of January, 2017

Michelle K. Lee
*Director of the United States Patent and Trademark Office*